United States Patent
Schiff

(10) Patent No.: US 7,443,150 B2
(45) Date of Patent: Oct. 28, 2008

(54) SWITCHING POWER SUPPLY CONTROL WITH PHASE SHIFT

(75) Inventor: Tod F. Schiff, Portland, OR (US)

(73) Assignee: Analog Devices, Inc., Norwood, MA (US)

( * ) Notice: Subject to any disclaimer, the term of this patent is extended or adjusted under 35 U.S.C. 154(b) by 16 days.

(21) Appl. No.: 11/243,520

(22) Filed: Oct. 3, 2005

(65) Prior Publication Data

US 2007/0001655 A1 Jan. 4, 2007

Related U.S. Application Data

(60) Provisional application No. 60/695,936, filed on Jun. 30, 2005.

(51) Int. Cl.
G05F 1/565 (2006.01)
G05F 1/575 (2006.01)

(52) U.S. Cl. ...................... 323/282; 323/272
(58) Field of Classification Search ............ 323/282, 323/237, 241, 243, 246, 268, 320, 351, 272; 332/109–111
See application file for complete search history.

(56) References Cited

U.S. PATENT DOCUMENTS

| | | | | |
|---|---|---|---|---|
| 5,268,631 | A * | 12/1993 | Gorman et al. | 323/246 |
| 5,625,279 | A * | 4/1997 | Rice et al. | 323/283 |
| 5,657,215 | A * | 8/1997 | Faulk | 363/41 |
| 6,232,755 | B1 * | 5/2001 | Zhang | 323/282 |
| 6,577,109 | B2 * | 6/2003 | Dancy et al. | 323/272 |
| 6,683,441 | B2 | 1/2004 | Schiff et al. | |
| 6,798,180 | B2 * | 9/2004 | Sase et al. | 323/282 |
| 6,943,535 | B1 | 9/2005 | Schiff | |
| 2003/0231010 | A1 * | 12/2003 | Sase et al. | 323/282 |
| 2004/0066845 | A1 | 4/2004 | Leith et al. | |
| 2004/0095264 | A1 | 5/2004 | Thomas | |
| 2004/0135560 | A1 | 7/2004 | Kernahan et al. | |
| 2005/0068793 | A1 | 3/2005 | Davies et al. | |
| 2005/0110472 | A1 | 5/2005 | Harris et al. | |

OTHER PUBLICATIONS

Maxim Max 1638, *High-Speed Step-Down Controller with Synchronous Rectification for CPU Power*, Nov. 1997.
Intersil Data Sheet, *Single Phase PWM Controller for Mobile Graphical Processing Unit (GPU) ISL6269*, Jun. 14, 2005, pp. 1-17.
PCT/US06/22095, PCT Notification of Transmittal of the International Search Report and the Written Opinion of the International Searching Authority, or the Declaration (1 page), PCT International Search Report (2 pages), PCT Written Opinion of the International Searching Authority (3 pages).
Institute of Electrical and Electronics Engineers, Inc., The New IEEE Dictionary of Electrical and Electronics Terms, pp. 939 and 941, 1993, New York, NY.

* cited by examiner

*Primary Examiner*—Jeffrey L Sterrett
*Assistant Examiner*—Harry Behm
(74) *Attorney, Agent, or Firm*—Marger Johnson & McCollom, PC

(57) ABSTRACT

A control system for a switching power supply shifts the phase of a PWM signal in response to a change in operating conditions. The phase may be shifted by resetting an oscillator that controls the PWM signal. Phase shift logic may include a sample-hold circuit that holds the value of an error signal when the PWM signal switches state. The held error signal may be compared to the real-time error signal, preferably with a user configurable offset. The output of the phase shift logic may be used to reset the oscillator.

6 Claims, 3 Drawing Sheets

SWITCHING POWER SUPPLY CONTROL WITH PHASE SHIFT

This application claims priority from U.S. Provisional Application Ser. No. 60/695,936 entitled Switching Power Supply Control With Phase Shift, filed Jun. 30, 2005, which is incorporated by reference.

BACKGROUND

FIG. 1 illustrates a conventional switching power supply control system that utilizes pulse width modulation (PWM). A power converter 10 controls the flow of power from a power source $V_{CC}$ to the load 12 in response to a pulse width modulation signal PWM. The power converter includes a single switching transistor Q1, inductor L1, and diode D1 arranged in a classic buck configuration. An error amplifier 16 generates an error signal $V_{ERR}$ by amplifying the difference between a feedback signal FB, which provides some measure of the output, and an input control signal $V_{IN}$. A controller 14 generates a PWM signal that controls the switching transistor in the power converter in response to $V_{ERR}$, so as to provide a regulated output, typically a constant voltage, to the load.

FIG. 2 illustrates an example waveform of the PWM signal generated by the controller 14. At time $t_0$, the PWM signal switches to the ON state which turns on the switching transistor in the power converter 10. A time $t_1$, the PWM signal switches to the OFF state, thereby turning the switching transistor off. The pulse width is the amount of time from $t_0$ to $t_1$ during which the PWM signal is in the ON state. The waveform of FIG. 2 has a period T which is the time between successive ON transitions of the PWM signal. To control the amount of power to the load, the controller varies the pulse width (duty cycle) of the PWM signal by varying the time $t_1$ at which the PWM signal switches off. For example, if the amount of power being supplied to the load is too low, the controller may leave the switch on longer until $t_1'$ so that the transistor switch in the power converter is on for a longer portion of the switching cycle. Conversely, if the amount of power being supplied to the load is too low, the controller may leave the switch on only until $t_1''$ so that the switch is on for a shorter portion of the switching cycle. The on time may be varied during each switching cycle to provide continuous output regulation.

The example described above may be referred to as trailing edge modulation because the second switching event (the turn off event in this case) during each switching cycle is varied. In leading edge modulation, the first switching even (e.g., turn on time) is varied, while the PWM signal turns off at a fixed time.

Various techniques have been suggested for improving the transient response of PWM switching power supplies. One technique involves the use of a voltage controlled oscillator (VCO) to control the switching cycle of the PWM signal. By applying an error signal to the VCO, the switching frequency of the PWM signal may be changed dynamically in an attempt to maintain a constant output voltage into a changing load. Another approach referred to as a glitch catcher circumvents the normal control loop to provide a temporary output current pulse directly from the supply $V_{CC}$ into the load in an attempt to prevent the output voltage from falling in response to a sudden increase in the load.

DETAILED DESCRIPTION

This patent disclosure encompasses numerous inventions relating to switching power supplies. These inventive principles have independent utility and are independently patentable. In some cases, additional benefits are realized when some of the principles are utilized in various combinations with one another, thus giving rise to yet more patentable inventions. These principles can be realized in countless different embodiments. Only the preferred embodiments are described below. Although some specific details are shown for purposes of illustrating the preferred embodiments, other equally effective arrangements can be devised in accordance with the inventive principles of this patent disclosure. Thus, the inventive principles are not limited to the specific details disclosed herein.

Figure 1:
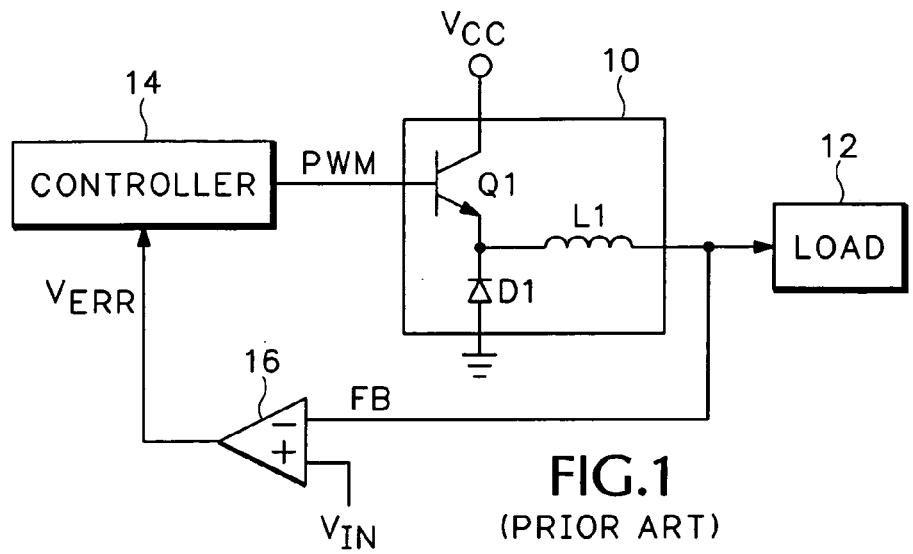
FIG. 1 illustrates a prior art PWM switching power supply control system.
Figure 2:
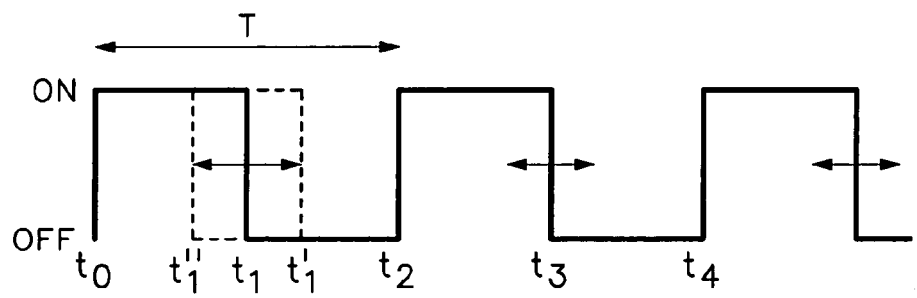
FIG. 2 illustrates an example waveform of a PWM signal from a prior art PWM switching power supply control system.
Figure 3:
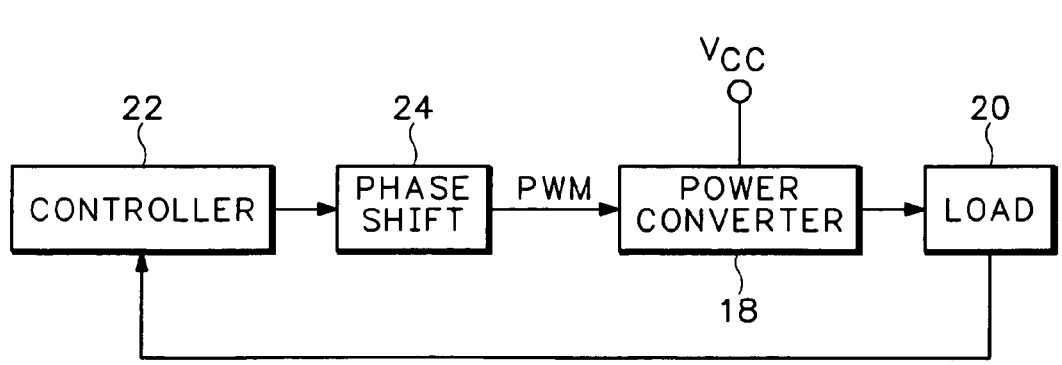
FIG. 3 illustrates an embodiment of a switching power supply having a control system according to the inventive principles of this patent disclosure.

FIG. 3 illustrates an embodiment of a switching power supply having a control system according to the inventive principles of this patent disclosure. The embodiment of FIG. 3 includes power converter 18 that may embody any suitable switching power supply topology and therefore may include any appropriate number and combination of switches, transformers, inductors, capacitors, diodes, and the like. For ease of explanation, the power converter in this example may be assumed to have a single switching element requiring only a single PWM signal, but the inventive principles are not limited to any particular topology and may encompass embodiments that utilize multiple PWM signals.

The PWM signal shown in FIG. 3 is generated by a controller 22 that has a provision for adjusting the phase of the PWM signal. The embodiment of FIG. 3 also includes phase shift logic 24 to shift the phase of the PWM signal in response to a change in operating conditions such as a change in the load 20, the power source $V_{CC}$, a control input signal, etc.

Figure 4:
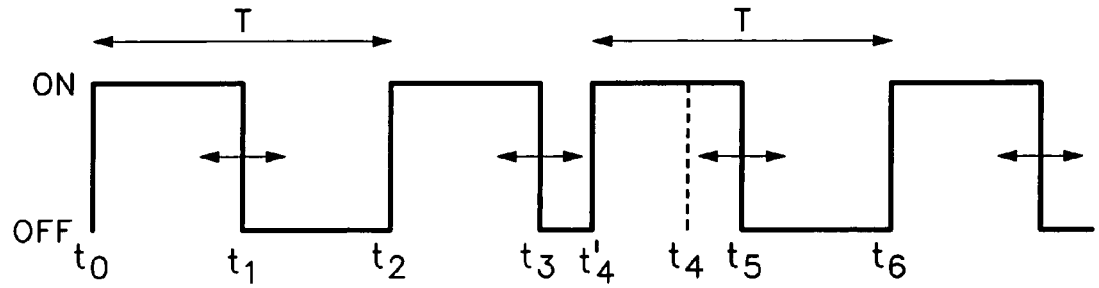
FIG. 4 illustrates an embodiment of a PWM signal according to the inventive principles of this patent disclosure.

This phase shift may be better understood with reference to FIG. 4 which illustrates an embodiment of a PWM signal according to the inventive principles of this patent disclosure. The switching cycle from $t_0$ to $t_2$ operates in a conventional manner with the PWM signal being switched off at time $t_1$ which may be varied to regulate the output to the load. The next cycle also begins with a conventional "on" pulse from $t_2$ to $t_3$, the width of which is also modulated to control the output. However, at some point during the off time beginning at $t_3$, the system detects a change in operating conditions, e.g., an increase in the load that increases the demand for power. If the PWM signal remains off until the normally scheduled turn on time at $t_4$, the output may droop to unacceptable levels. In the embodiments of FIG. 4, however, the turn on is accelerated with the PWM signal being quickly turned back on at $t_4'$ to respond more quickly to the changed operating conditions. This imparts a phase shift to the PWM signal which reverts back to a normal period T during subsequent switching cycles.

The principles of phase shifting a PWM signal according to the inventive principles of this patent disclosure may be applied to all forms of PWM converter topologies and control techniques including leading edge modulation, trailing edge modulation, etc. For example, in an implementation with leading edge modulation, the PWM signal may be turned off immediately upon a change in operating conditions rather than waiting for the normal turn off time. The phase shift logic 24 illustrated in FIG. 3 may be implemented in hardware, software, or any suitable combination thereof. Embodiments according to the inventive principles of this patent disclosure may also include additional apparatus such as error amplifiers, outputs sensors, etc. which may be separate from the apparatus shown in FIG. 3, or may be fabricated integral with the apparatus in a synergistic manner as will be described below.

Figure 5:
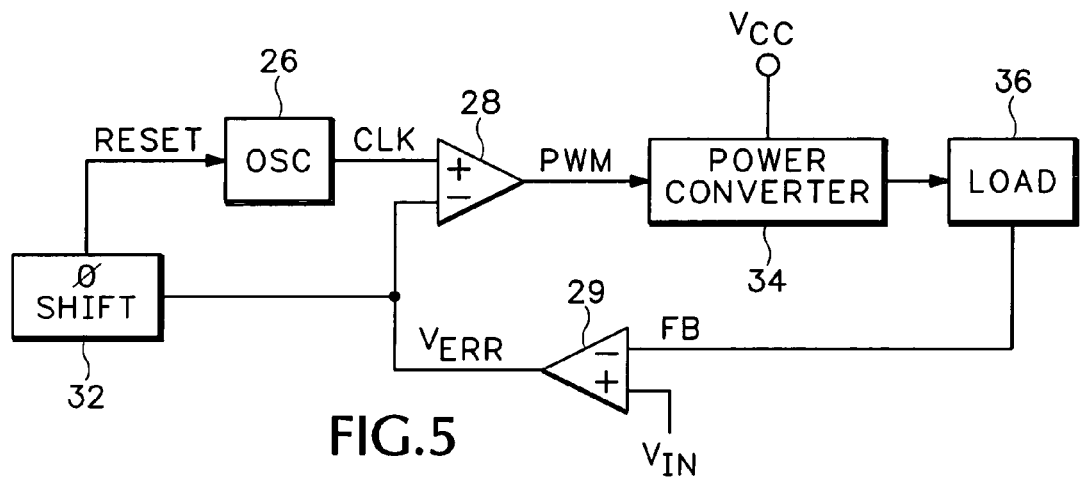
FIG. 5 illustrates another embodiment of a switching power supply having a control system according to the inventive principles of this patent disclosure.

FIG. 5 illustrates another embodiment of a switching power supply having a control system according to the inventive principles of this patent disclosure. In the embodiment of FIG. 5, the controller includes a comparator 28 which generates the PWM signal in response to a clock signal from an oscillator 26 and an error signal $V_{ERR}$ from an error amplifier 29. The phase shift logic 32 shifts the phase of the PWM signal by resetting the oscillator 26. In this embodiment, the phase shift logic detects a change in operating conditions by monitoring the error signal $V_{ERR}$.

Figure 6:
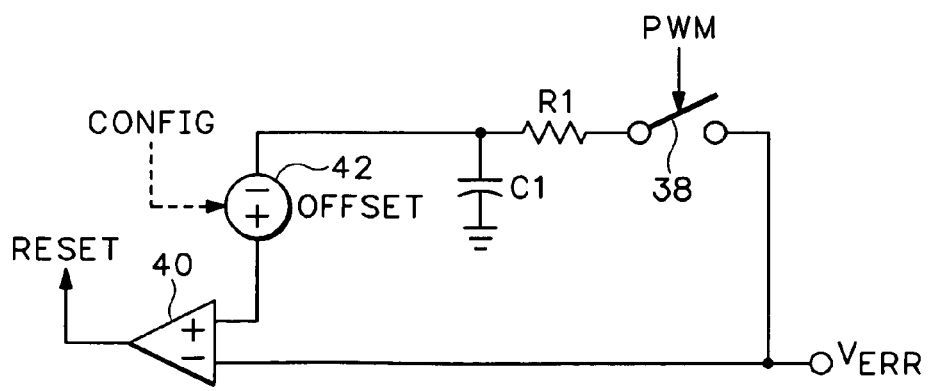
FIG. 6 illustrates an embodiment of a phase shifting circuit for a switching power supply control system according to the inventive principles of this patent disclosure.

FIG. 6 illustrates an embodiment of a phase shifting circuit for a switching power supply control system according to the inventive principles of this patent disclosure. A switch 38, resistor R1 and capacitor C1 form a sample-hold circuit that tracks an error signal $V_{ERR}$ when the switch is closed during the on time of the PWM signal. When the PWM signal turns off, a comparator 40 compares the sampled value of $V_{ERR}$ that is held on C1 to the real-time value of $V_{ERR}$ to monitor changes in operating conditions. The output of the comparator generates a reset signal that may be used to phase shift the PWM signal, for example, by resetting an oscillator that controls the PWM signal. An offset 42 may be added to an input of the comparator to provide noise immunity and/or set a threshold level for phase shifting the PWM signal. The offset may be user configurable as shown in FIG. 6. In an embodiment for a multi-phase power converter that utilizes more than one PWM signal, the PWM signals may be logically OR'ed so that the sample-hold circuit holds the sampled value whenever all phases are off.

Figure 7:
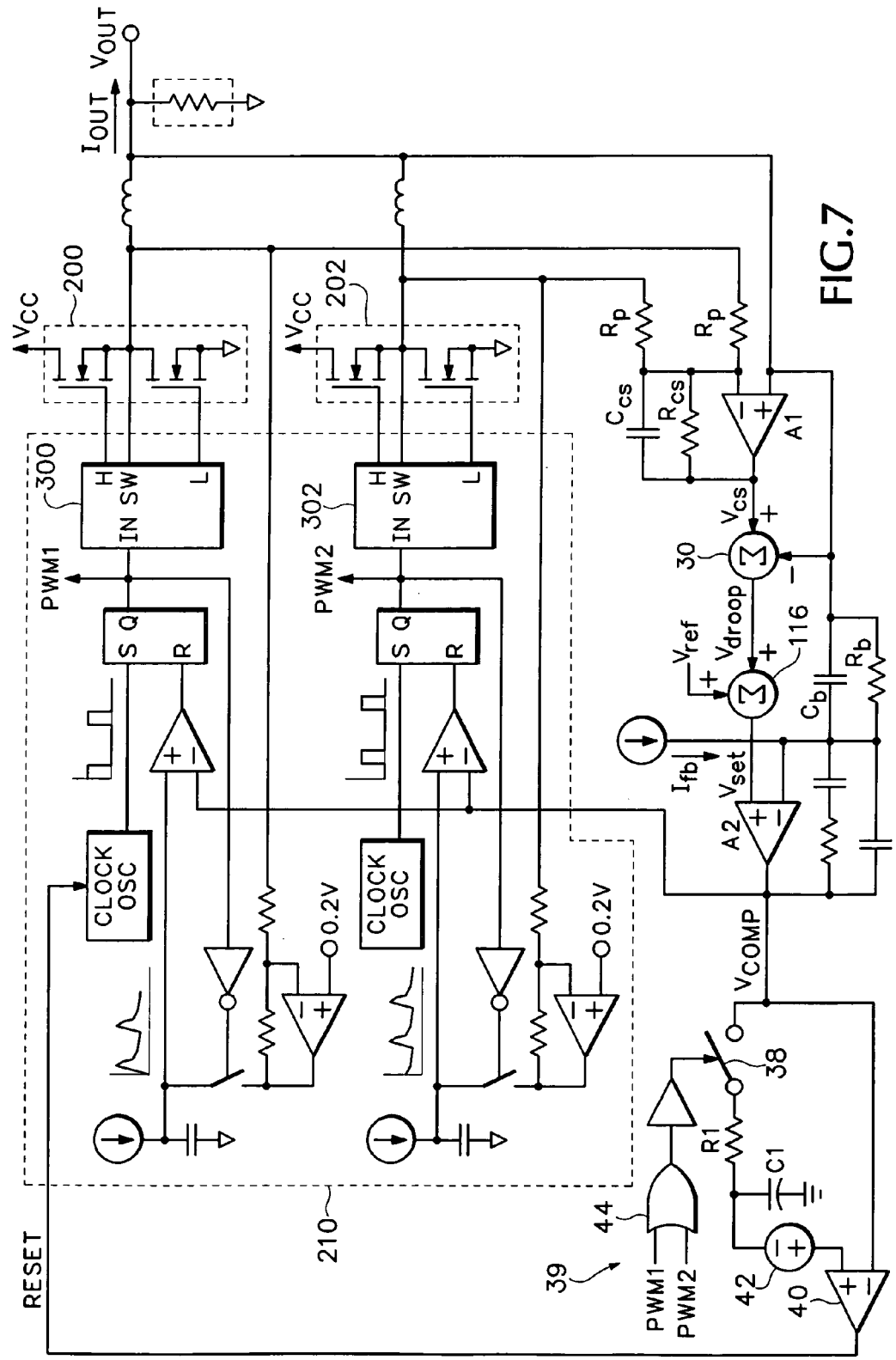
FIG. 7 illustrates another embodiment of a switching power supply having a control system according to the inventive principles of this patent disclosure.

FIG. 7 illustrates another embodiment of a switching power supply having a control system according to the inventive principles of this patent disclosure. The embodiment of FIG. 7 includes a two-phase power converter with a PWM control system having multiple output representational signals summed for control purposes as described in U.S. Pat. No. 6,683,441 B2 which has a common inventor with the present patent disclosure. The output signal $V_{COMP}$ from the voltage control feedback amplifier A2 provides a convenient error signal for the phase shift logic 39. The PWM signals PWM1 and PWM2 are combined in OR gate 44 to control the sample-hold switch 38. The RESET output from comparator 44 resets the oscillator in controller 210 to phase shift the PWM signals in response to a change in operating conditions. Thus, a robust and synergistic control system with improved transient response may be realized by adding very few additional components and utilizing signals that already exist in a PWM control system.

The inventive principles of this patent disclosure have been described above with reference to some specific example embodiments, but these embodiments can be modified in arrangement and detail without departing from the inventive concepts. Thus, such changes and modifications are considered to fall within the scope of the following claims.

The invention claimed is:

1. A switching power supply control system comprising:
   a controller to generate a pulse width modulated (PWM) signal for controlling power to a load through a DC-to-DC switching power supply; and
   logic to generate a reset signal to shift the phase of the PWM signal in response to a change in operating conditions;
   where the controller comprises an error amplifier to generate an error signal in response to an output of the power supply; and
   where the logic comprises a sample-hold circuit to generate a held error signal by tracking and holding the error signal in response to the PWM signal, and a comparator to generate the reset signal by comparing the error signal to the held error signal.

2. The system of claim 1
   where the controller further comprises:
   a clock oscillator to generate a clock signal, the clock oscillator being resettable in response to the reset signal,
   a second comparator having a first input coupled to receive a ramp signal and a second input coupled to receive the error signal; and
   a flip-flop to generate the PWM signal, the flip-flop having a first logic input coupled to receive the clock signal and a second logic input coupled to an output of the second comparator.

3. The system of claim 1 where the logic further comprises an offset circuit coupled to one input of the comparator to provide an offset between the error signal and the held error signal.

4. The system of claim 3 where the offset circuit is user configurable.

5. A switching power supply control system comprising:
   a controller to generate a switching output signal having a period and a duty cycle to control power to a load through a DC-to-DC switching power supply; and
   logic to change the period only once in response to an isolated change in operating conditions;
   where the controller comprises:
   an error amplifier to generate an error signal in response to an output of the power supply;
   a clock oscillator to generate a clock signal, the clock oscillator being resettable in response to the reset signal,
   a first comparator having a first input coupled to receive a ramp signal and a second input coupled to receive the error signal; and
   a flip-flop to generate the switching output signal, the flip-flop having a first logic input coupled to receive the clock signal and a second logic input coupled to an output of the first comparator; and
   where the logic comprises:
   a sample-hold circuit to generate a held error signal by tracking and holding the error signal in response to the PWM signal, and
   a second comparator to generate the reset signal by comparing the error signal to the held error signal.

6. The system of claim 5 where the logic only changes the period if the change in operating conditions exceeds a threshold.

* * * * *